Patented Sept. 30, 1952

2,612,458

UNITED STATES PATENT OFFICE 2,612,458

METHOD AND COMPOSITION FOR RENDERING WINDOW SURFACES WATER REPELLENT AND PRODUCT RESULTING THEREFROM

Donald F. Stedman, Ottawa, Ontario, Canada, assignor to The Honorary Advisory Council for Scientific and Industrial Research, Ottawa, Ontario, Canada, a corporation of the Dominion of Canada No Drawing. Application June 18, 1947, Serial No. 755,490. In Canada March 7, 1945

13 Claims. (Cl. 117—92)

1

This invention relates to methods and compositions for the treatment of glass and plastic windows, in a manner such that they will not wet with water. It is particularly concerned with the problem of rendering aircraft windows rain repellent so that clear vision may be maintained, but it is also applicable to the maintenance of clear vision through windscreens, lenses or other optical surfaces, subjected to rain or water spray in various locations, such as periscopes, binoculars, boats, motor cars, locomotives and the like.

It is to be noted that there is a critical distinction between an anti-misting treatment which causes water on a lens or window to spread in a thin uniform film and the treatment of the present invention which causes water to collect in spherical droplets which grow until they roll down or are blown away by the wind when the air velocity is adequate.

It might be considered, and usually is, that the even spreading of a uniform film of water would give best vision, but for specific applications this is not the case. This is due to the fact that the uniform film has raindrops impinging, and the wind also causes ripples. In such case the glass is clear, but the wet outside surface is not optically flat, and distortion results. In the present case, with droplets on a dry glass, the area between the droplets is free from water and is optically unchanged. Thus where accuracy of vision is necessary it produces a much better result, and if wind is also present the difference is enhanced, since the result produced by the "anti-fog" becomes worse, but the effect of the repellent is better.

Recording the appearance of relatively distant objects through windscreens subjected to rain is a problem in optics of considerable complexity. The present invention is the result of an intensive investigation of all the factors involved.

The object of the present invention is to provide a treatment for windshields and the like which insures: ease of application without too greatly skilled personnel; clarity of vision with reference to the optical quality of the coating film as well as the perfection with which it repels the water; long life per application including lack of damage by light, the heat of the sun, weather exposure or flight under dry conditions; ease of renewal of the repellent coating; freedom from damage by de-icing procedures, spattering with oil and the like; that the coating should not collect dirt too rapidly and that it should clean readily.

A more specific object of the invention is to provide a new composition which is itself rain repellent and which provides a particularly good attachment between a wax coating and the glass, and a method of activating such composition. Other objects and advantages of the invention will appear from the following description.

Of all classes of substances, the water repellent non-polar waxes come nearest to fulfilling these requirements, but it is well known that such non-polar substances will not adhere to a highly polar substance such as glass, and the main object of this invention is to provide a method by which the glass is caused to become a non-polar water repellent surface. Its nature is then similar to the above mentioned waxes and these waxes therefore adhere well.

This application is a continuation-in-part of application Serial No. 582,426 filed May 12, 1945, now abandoned.

It has been found that an excellent non-polar water repellent surface can be secured on glass by the use of strong friction while rubbing it with an alkyl or aryl substituted poly-silicane, of which hexa-ethyl di-silicane, $$(C_2H_5)_3 \equiv Si - \equiv (C_2H_5)_3$$

is a type compound. All compounds of this class, in which the silicon chain consists of two or more silicon atoms are combined with hydrocarbon groups, are active in this respect. They may be varied in the following manners and still produce excellent results:

(a) Although the similarly substituted mono-silicanes, which may be considered as derived from $SiH_4$ by substituting hydrocarbon groups for H, are active to some extent, they are much inferior to the hydrocarbon substituted poly-silicanes in which a chain of silicon atoms is present. If conversely the silicon chain is longer than two atoms the results are slightly better;

(b) The hydrocarbon groups may be varied almost indefinitely, any alkyl or aryl hydrocarbon group, e. g., methyl, butyl, lauryl, cetyl, phenyl and generally any member of the hydrocarbon groups may be used;

(c) The substituted hydocarbon groups need not be the same. If all the substituent hydrocarbons are methyl the best results are not obtained. If, on the other hand, all have, for example, 16 carbon atoms, the resulting film on the window surface becomes visible.

(d) Unsaturated hydrocarbon groups may be substituted for some of the saturated hydrocarbon groups. The following are illustrative of these poly-silicanes. The particular position of

For this purpose any wax of this class is helpful, but in order to secure optimum results a rather closely adjusted composition has been found best. Preferably the wax composition used should be as free as possible from polar constituents. The preferred composition is a combination of a tough, hard non-polar mineral wax, a relatively soft non-polar paraffin wax substantially free from oil and of great water repellence, polyethylene and a non-polar fiberizing component such as polyisobutylene. Butyl rubber may be used but its slight unsaturation produces some instability to ultra violet light. For this reason polyisobutylene is preferred. The polyethylene facilitates polishing, gives more water repellency over a longer period of time and permits use of harder wax. 3 to 10% of it may be used. 6.4% is preferred.

The mineral wax component if not already adequately non-polar may be treated with sodium metal at substantially 250° C. followed by treatment with activated bentonite and filtration. For example 400 grams of an amorphous mineral wax having a melting point of substantially 93° C. was heated with 20 grams of sodium metal to 250° C. for 1½ hours. The wax was decanted from the sodium, cooled to its melting point, treated with 25 grams activated bentonite, heated to 175° C. for 10 minutes, again cooled to its melting point and treated with a further 25 grams of bentonite, and filtered hot. About 360 grams of pale yellow wax was obtained. It is extremely tough and moderately hard and has a high receding angle for water droplets. The composite wax mixture should contain between substantially 19% and 38% of such purified amorphous mineral wax. The preferred proportion is 29.07%.

For the paraffin component a high grade commercial paraffin wax having a melting point of 64° C. or higher is used, and needs no further purification. Harder paraffin waxes are rather crystalline and therefore permit polishing over a wider range of temperature, while the softer waxes cause difficulty in polishing the film, as they streak easily. When judged by the criterion of high receding angle for water droplets, paraffin wax is the most repellent of the waxes, but too high proportions prevent proper polishing. Accordingly the composite mixture should contain not more than substantially 70% nor less than 49% of paraffin wax, while the preferred proportion is substantially 57.9%.

The standard grade of polyisobutylene of about the consistency of raw rubber and having a Shore hardness of about 20–30 is purified by dissolving as 2% solution in petroleum ether of 30° to 60° C. boiling point, and precipitated by the slow addition with stirring of 27.5 cc. of acetone to each 100 cc. of the solution. The precipitate is collected on a filter and dried. The presence of this ingredient in the composite wax mixture greatly retards the removal of the wax by wearing, during the impact of water droplets. If, however, too much is added, sticky spots of a rubber-like nature develop while attempting to polish the wax. This effect therefore limits the useful addition of this ingredient. The composite material preferably contains 6.7% of the reprecipitated polyisobutylene. The proportion should not be less than 3% nor more than 10%.

The composition of the non-polar coating is as follows:

| | Per cent |
|---|---|
| Purified amorphous mineral wax | 19–38 |
| Paraffin wax (M. P. 64° C. or higher | 49–70 |
| Polyisobutylene | 3–10 |
| Polyethylene | 3–10 |

The following is illustrative of the composition of the preferred wax coating material, which may be provided in the form of a stick, as a paste or as a liquid thinned out with enough solvent to spray on the surface.

An example of the wax mixture made as a paste is as follows:

| | Per cent by weight |
|---|---|
| Purified mineral wax | 29.0 |
| Paraffin | 57.9 |
| Polyisobutylene | 6.7 |
| Polyethylene | 6.4 |

380 c. c. of petroleum naphtha, 160° C. to 200° C. boiling range, is added to each 100 grams of this mixture. Xylol or toluol may be used in place of the petroleum naphtha.

By reducing the naphtha in the above composition to 10 parts the mixture may be formed into sticks. The stick form has some advantages over the paste form as the paraffin in the latter tends to crystallize out and more rubbing is required for effective polishing.

The following is an example of preparing a mixture as a thin liquid for use in reviving coatings during flight. In this case it is best to use an excess of the mineral wax, since it crystallises out on cooling the solution and must be filtered off and discarded:

| | Per cent by weight |
|---|---|
| Purified amorphous mineral wax | 47.6 |
| Paraffin wax | 47.6 |
| Reprecipitated polyisobutylene | 2.4 |
| Polyethylene | 2.4 |

100 grams of this mixture is dissolved in e. g. xylol 19,000 cc. with heat, cooled to 20° C. and filtered. To the filtrate, which now contains the solid components within the range of compositions stated above to be desirable, are added 19,000 cc. of petroleum solvent (naphtha as above). Although these wax proportions are preferred, owing to the somewhat variable nature of waxes, as natural products, it is necessary to adjust the proportions to suit every batch of wax in order to maintain the proper hardness at both low and high temperatures.

Shore Durometer Type A hardness of the polyisobutylene used was 20 to 30. Polyethylene used has a viscosity in poises at 130° C. from 3 to $6 \times 10^5$.

Since the amount of wax applied to the glass is very small, of the order of 30 mg. per ten sq. decimeters, for preparing the surface to be coated and for applying and polishing the coating it is important to use a cloth from which natural waxes and resins have been removed. These waxes blend with the wax mixture applied and are detrimental to the properties of the final coating as the natural waxes on the cloth are in general polar compounds. They therefore prevent water running off as easily and reduce the useful life of the coating. Accordingly the cloth is subjected to a very thorough washing, rinsing and drying, followed by extraction with methanol and benzene in an apparatus which boils the solvent and returns the pure distillate over the cloth continuously. For best results the cloth is so extracted with about 100 times its weight of methanol and benzene. If ethanol and benzene are used about 250 times the weight of the cloth should be used. Such a treatment removes from the cloth as much as 0.75% of its weight of wax of a non-repellent type and leaves a fabric having less than one milligram of polar compounds per ten square decimeters of cloth area. The cloth is then considered to be free from these polar compounds.

Rayon cloth made from high quality wood pulp or cotton linters may be used. It is important that no sizing be present in the finished cloth. Papers made from rayon fibers may also be used provided they contain no deleterious substances.

The rain repellent treatment is applied as follows: The surface to be coated is thoroughly cleaned with a cloth free from polar compounds by rubbing with cellite (a fine diatomaceous earth) and water. The poly-silicane composition or paste containing carbon black and solvent is then applied with the cloth, using sufficient friction to activate the silicane. The carbon black is wiped off, leaving a clean surface. For aircraft windows the composite wax preparation is then applied with the cloth. When it dries it is polished with a dry cloth. The glass is then highly repellent to water and the film coating is so strong that flight through rain does not damage the surface. It is also not damaged by de-icing procedures.

This treatment can be applied at any temperature from −40° F. to +135° F. The only variations in technique needed are the use of methyl or ethyl alcohol, denatured or otherwise, instead of water for cleaning the glass below the freezing point, and a second wet polishing at high temperatures when the usual dry polishing leaves a slightly smeared surface.

Throughout this specification glass is understood either as the usual glass, or as transparent plastic material serving the same purpose.

As compared with previously known procedures the present treatment has many advantages. It can be applied quickly anywhere; it has long life; it gives very clear vision in rain without using wipers; the film is invisible and free from optical distortion; the materials used are stable in storage, are non-corrosive and free from harmful constituents; it is helpful in preventing scratching of plastics; it can be readily renewed; it is relatively inexpensive; it is not damaged by oil, gasoline, alcohol or glycol.

It is to be understood that variations may be made without departing from the spirit or scope of the invention as defined in the appended claims. By non-polar wax, as used herein, is meant a compound consisting only of carbon and hydrogen atoms (hydrocarbon), which has been purified to remove substantially all polar compounds.

I claim:

1. A method of rendering window surfaces water and rain repellent which comprises applying thereto a substituted polysilicane, consisting only of carbon, hydrogen and silicon and having not less than one Si-Si linkage and at least one of a group consisting of alkyl and aryl radicals attached to at least one Si atom in said linkage, in admixture with a volatile hydrocarbon solvent and a finely divided inorganic, non-siliceous adhesion-promoting agent which with rubbing changes said poly-silicane from a form which is soluble in hydrocarbon solvent to one which is insoluble therein and selected from the group consisting of carbon black, rouge, barium sulphate, lithopone and the precipitated fluorides of calcium, barium, strontium and lithium, and rubbing the mixture on the surface to cause the polysilicane to adhere to it in the form of a film which is inert to oil, gasoline, alcohol and glycol.

2. A method as defined in claim 1 wherein there is applied to said film a water repellent wax which is essentially non-polar.

3. A method as defined in claim 1 wherein there is applied to said film coating a non-polar composition consisting essentially of 19 to 38% by weight of purified amorphous mineral wax having a melting point of substantially 93° C., 49 to 70% by weight of a paraffin wax having a melting point of at least 64° C., 3 to 10% of polyisobutylene and 3 to 10% of polyethylene.

4. A method as defined in claim 1 wherein the film is applied with a fabric containing less than one milligram of matter extractable by a mixture of benzene and methanol per ten square decimeters of fabric area.

5. A composition for rendering window surfaces water and rain repellent comprising essentially substituted polysilicane, consisting only of carbon, hydrogen and silicon and having not less than one Si-Si linkage and at least one of a group consisting of alkyl and aryl radicals attached to at least one Si atom in said linkage, in admixture in a volatile hydrocarbon solvent with a finely divided, inorganic, non-siliceous adhesive-promoting agent which with rubbing changes said poly-silicane from a form which is soluble in hydrocarbon solvent to one which is insoluble therein and selected from a group consisting of carbon black, rouge, barium sulphate, lithipone and the precipitated fluorides of calcium, barium, strontium and lithium.

6. A composition for rendering window surfaces water and rain repellent comprising essentially substituted polysilicane, consisting only of carbon, hydrogen and silicon and having not less than one Si-Si linkage and at least one of a group consisting of alkyl and aryl radicals attached to at least one Si atom in said linkage, in admixture with a volatile hydrocarbon solvent and acetylene black.

7. A composition for forming with rubbing a rain repellent essentially non-polar film on window surfaces, consisting of hexa-ethyl disilicane and carbon black in a volatile hydrocarbon solvent.

8. A composition for forming with rubbing a water repellent essentially non-polar film on window surfaces, consisting of hexabutyl disilicane and carbon black in a volatile hydrocarbon solvent, said film being inert to oil, gasolene, alcohol and glycol.

9. A composition for forming with rubbing a water repellent essentially non-polar film on window surfaces, consisting of tetra heptyl di-ethyl disilicane and carbon black in a volatile hydrocarbon solvent, said film being inert to oil, gasolene, alcohol and glycol.

10. A window surface having thereon a film produced by the method defined in claim 1 and consisting essentially of adherent substituted polysilicane consisting only of carbon, hydrogen and silicon and having not less than one Si-Si linkage and at least one of a group consisting of alkyl and aryl radicals attached to at least one Si atom in said linkage.

11. A window surface having thereon a composite film consisting essentially of adherent substituted polysilicane consisting only of carbon, hydrogen and silicon and having not less than one Si-Si linkage and at least one of a group consisting of alkyl and aryl radicals attached to at least one Si atom in said linkage, and on the adhering polysilicane a non-polar wax composition consisting essentially of 19 to 38% by weight of purified amorphous mineral wax having a melting point of substantially 93° C., 49 to 70% by weight of a paraffin wax having a melting point of at least 64° C., 3 to 10% of polyisobutylene and 3 to 10% of polyethylene.

12. A window surface as defined in claim 11 wherein the polyisobutylene has a Shore Durometer Type A hardness of 20 to 30.

13. A window surface produced by the method defined in claim 2 having thereon a film consisting essentially of adherent substituted polysilicane consisting only of carbon, hydrogen and silicon and having not less than one Si-Si linkage and a non-polar water repellent wax on said film.

DONALD F. STEDMAN.

REFERENCES CITED

The following references are of record in the file of this patent:

UNITED STATES PATENTS

| Number | Name | Date |
|---|---|---|
| 2,030,736 | Bley | Feb. 11, 1936 |
| 2,229,356 | Wiezevich | Jan. 21, 1941 |
| 2,258,219 | Rochow | Oct. 7, 1941 |
| 2,298,846 | Skooglund | Oct. 13, 1942 |
| 2,306,222 | Patnode | Dec. 22, 1942 |
| 2,339,958 | Sparks | Jan. 25, 1944 |
| 2,383,817 | Rochow | Aug. 28, 1945 |
| 2,386,259 | Norton | Oct. 9, 1945 |
| 2,388,161 | Kropa | Oct. 30, 1945 |
| 2,388,984 | Mack | Nov. 13, 1945 |
| 2,390,370 | Hyde | Dec. 4, 1945 |
| 2,439,689 | Hyde | Apr. 13, 1948 |
| 2,453,644 | Steinkraus | Nov. 9, 1948 |